United States Patent [19]
Elliott et al.

[11] Patent Number: 4,923,555
[45] Date of Patent: May 8, 1990

[54] APPARATUS FOR STEAM LAMINATION

[75] Inventors: George M. Elliott, Alpharetta; Ervin L. Watford, Jr., Rome; George W. Howell, Nelson, all of Ga.

[73] Assignee: Astechnologies, Inc., Roswell, Ga.

[21] Appl. No.: 234,927

[22] Filed: Aug. 22, 1988

Related U.S. Application Data

[63] Continuation of Ser. No. 905,405, Sep. 10, 1986, abandoned.

[51] Int. Cl.⁵ .................... B32B 31/00; B30B 5/02; B30B 15/20
[52] U.S. Cl. .................... 156/497; 156/583.5; 156/583.7; 156/500; 38/10; 100/74; 425/407
[58] Field of Search .................... 38/1 B, 7, 8, 9, 10, 38/11, 14, 15, 16, 62, 66; 100/73, 74, 93 R; 425/115, 407, 408; 264/82, 101; 156/356, 497, 538, 556, 580, 583.1, 583.2, 583.3, 583.4, 583.5, 583.6, 583.7, 583.8, 583.9, 583.91

[56] References Cited

U.S. PATENT DOCUMENTS

| | | | |
|---|---|---|---|
| 869,895 | 11/1911 | Goldman | 38/14 |
| 1,526,014 | 2/1925 | Russell et al. | 219/283 |
| 2,104,402 | 1/1938 | Rieffel | 38/14 |
| 2,712,054 | 6/1955 | King | 219/283 |
| 3,107,447 | 10/1963 | Tucci | 38/14 |
| 3,654,019 | 4/1972 | Cusick | 156/285 |
| 3,668,786 | 6/1972 | Barny | 38/8 |
| 3,891,738 | 6/1975 | Shen | 264/101 |
| 4,124,421 | 11/1978 | Fujii | 156/221 |
| 4,197,663 | 4/1980 | Riedel | 38/11 |
| 4,219,948 | 9/1980 | Miranker | 34/236 |
| 4,323,410 | 4/1982 | Urai | 156/228 |
| 4,469,655 | 9/1984 | Kiss | 424/112 |
| 4,560,431 | 12/1985 | Inselman | 156/555 |
| 4,718,153 | 1/1988 | Armitage | 156/72 |
| 4,786,351 | 11/1988 | Elliott et al. | 156/497 |

OTHER PUBLICATIONS

Apparel World (Feb. 1985); Effective Outwear Fusing With 20% Less Heat; W. Hartenstine.
The New Multistar Plus Technology—Fabric-Safe Outerwear Fusing; (Sept. 1985); Kannegiesser.

*Primary Examiner*—Michael W. Ball
*Assistant Examiner*—Louis Falasco
*Attorney, Agent, or Firm*—Sutherland, Asbill & Brennan

[57] ABSTRACT

Two sheets of material are laminated together using a heat-activatable or moisture-curing adhesive by:
(a) forming a layered composite of the material with a layer of the adhesive in between;
(b) passing steam (preferably superheated) through one sheet of material into the adhesive layer;
(c) compressing the heated composite before the adhesive sets;
(d) releasing the pressure on the composite; and
(e) allowing the adhesive to fully cure.

A laminating machine is disclosed that pulls the composite between two open weave belts, past narrow jets of the steam.

22 Claims, 2 Drawing Sheets

APPARATUS FOR STEAM LAMINATION

This application is a continuation of application Ser. No. 905,405 filed Sept. 10, 1986 now abandoned.

This invention relates to the steam lamination of two or more sheets of material using an adhesive that is activated by heat or moisture.

There are many manufacturing processes which require two or more sheets of material to be laminated together. In the clothing industry, for example, interlining fabric is laminated to suiting fabric to make it stiffer. In the shoe industry cloth interlinings are laminated to vinyl or leather uppers. In the auto industry upholstery fabric is laminated to cushion foam to make seat covers, door panels, and interior trim. These are but a few of the examples that can be cited.

The most common apparatus used today to perform such laminations in a continuous manner are machines using conductive heat which is transferred from impervious moving belts that are clamped against the opposite sides of the layered composite. The belts are tightly woven and coated with a synthetic resin such as Teflon ®. The belts pass over or under heated channels, or past a radiant heater, before contacting the workpiece. The belts must be heated to above the activation temperature of the adhesive, e.g., to about 30 to 60 Fahrenheit degrees higher. Care must be exercised in choosing the adhesive, lest its activation temperature be above the point at which the sheet material would begin to degrade. A good example is fabrics made of polypropylene. These normally are quite susceptible to heat and will begin to shrink at temperatures as low as about 200° F. Suitable fabric adhesives that will set at lower temperatures are generally solvent-containing liquids. These often release unhealthy or otherwise harmful vapors when curing. It would be desirable if there were a machine for performing such laminations which would permit the use of a normally solid adhesive instead. Solid adhesives are easier to apply in a uniform layer, and they result in less run-off and waste. Also, solid adhesives normally do not emit harmful or dangerous fumes when they cure. With the conductive laminators currently being used, solid adhesives generally can be used only when laminating sheet materials that have relatively high degradation temperatures.

We are aware that in the clothing industry it was common many years ago to use steam fusing machines to laminate interlining fabric, e.g., buckram or crinoline, to suiting fabric. These machines used saturated steam at temperatures of about 290°–340° F. The steam was ejected through the holes in a perforated steam plate pressed against the interlining ply. The process was slow and discontinuous, however, and has largely been replaced by dry laminators using conductive or radiant heat.

The degradation of fabric that can occur when using dry laminators includes shrinkage, color migration, and shining. Also, if the fabric has a nap, there is a danger of crushing the nap if too high a platen temperature is used.

The method of the present invention laminates two or more sheets of material together, using a heat- or moisture-activatable adhesive, by:

(a) forming a layered composite of the sheets with the adhesive between, (b) passing steam through one of the sheets into the adhesive layer, the temperature and/or moisture content of the steam being high enough to activate the adhesive, and continuing such steam flow until substantially all of the adhesive has been activated, (c) compressing the steamed composite before the adhesive has set, (d) releasing the pressure on the composite, and (e) allowing the adhesive to fully cure.

Dry saturated steam can be used in the present method if the steam-permeable sheet material is relatively thin. Preferably the steam is superheated, however, and is at a pressure of about 40 to 90, most preferably about 75 to 85, pounds per square inch gauge (psig). It may, for example, have a temperature at least about 50 Fahrenheit degrees above the saturation temperature corresponding to its pressure. Most preferably the steam will have a temperature about 100 to 300 Fahrenheit degrees above the saturation temperature corresponding to its pressure. Thus, for instance, the saturation temperature of 80 psig steam is approximately 325° F. In the present process it is preferred that 80 psig steam be heated to at least about 375° F.; ideally to about 425° to 625° F.

It also is preferred that the present process be run in a continuous manner. The steaming step can be run continuously by drawing the composite of the two sheets and intermediate adhesive between a pair of moving, opposed, open mesh belts and through a series of jets of the superheated steam. The steam jets should be directed substantially perpendicularly to the plane of the belts. The compressing step can be conducted continuously by withdrawing the heated composite from the open mesh belts and passing it through a pair of pressure rollers. When conducted in this manner, production times can be reduced substantially.

A host of different types of sheet materials can be laminated using the process of the present invention. At least one of the sheets must be steam-permeable. Examples of suitable steam-permeable sheet materials are woven fabrics, knit fabrics, non-woven fibrous mats and fabrics (e.g., needle-punched fabrics), open-cell foam, and porous particleboard. The second sheet need not be steam-permeable. In addition to the materials just mentioned, plastic film and steam-impervious cellulosic webs (e.g., paperboard) can be used as the second sheet. The sheets can be continuous or cut parts. All types of fibers can be used in the fabrics, including wool, polyester, cotton, polypropylene, fiberglass, rayon, and polyacrylate.

The adhesive used can be either heat-activatable or moisture-curing, and it can be thermoplastic or thermosettable. Solid adhesives often are preferred. These can be applied to one of the sheets in particulate form or can be interleaved between the sheets in the form of films or webs. Solid, moisture-curing adhesives can be applied in molten form immediately ahead of the laminator.

If a heat-activatable adhesive is used, it preferably will have an activation temperature somewhere in the range of about 140° to 350° F. Among the suitable heat activatable adhesives are polyamide adhesives, polyester adhesives, and vinylic polymer adhesives, e.g., the vinyl acetate polymers such as polyvinyl acetate and ethylene-vinyl acetate copolymers. Thermoplastic polyamide and polyester adhesives often 1 are preferred for laminating foam or interlining to fabric. These adhesives usually have a melt point somewhere in the range of about 190° to 350° F. For laminating foam to fabric a melt point of about 220° to 230° F. often is preferred. For fusing interlining to suiting fabric an adhesive melting somewhere in the range of about 240° to 270° F. usually is preferred.

When laminating interlining to shoe upper material, a thermoplastic polymer of vinyl acetate, preferably an ethylene-vinyl acetate copolymer, is advantageously used as the adhesive. It may have a melt point of about 140° to 190° F., preferably about 170° to 190° F.

Polyurethanes are the preferred moisture curing adhesives. These are normally solids that are solvent-free. Prior to heating they have about the same consistency as paraffin wax. They usually have a melting point in the range of about 150° to 200° F. They can be applied to the sheet material by heating them to melting and then either coating them on the material, using a gravure roll or a slot die, or spraying them on the material. When cured in ambient air, polyurethane adhesives usually require several minutes of tack time before the laminated material can be subjected to further handling or processing. Using the method of the present invention, the polyurethane-adhered laminates require much shorter tack times. We have laminated ½ inch thick open-cell foam to a woven polyester cloth, for example, using Bostik No. 9601 polyurethane and were able to begin cutting and sewing operations only 10 seconds after the compression step. The advertised tack time for this thermosettable adhesive is 3 minutes, when allowed to cure at room temperature in the open air. The foam we used was a thermoplastic, polyether-based polyurethane. We have experienced the same success when laminating this foam to a cloth-backed vinyl fabric, using the Bostik No. 9601 adhesive.

The use of the steam in the present method supplies some of the moisture needed to cure the polyurethane and accelerates the curing by heating the adhesive. The conditions of the steam ejection need to be balanced, in terms of temperature and duration, to provide enough moisture to cross-link the polyurethane, but not so much of an excess that the laminate comes out wet. Process times in the laminator are generally shorter when using the moisture-curing adhesives than when using the heat activatable ones. This allows for more production per machine, with less energy consumption per laminated article.

An advantage of the present lamination method is that it does not require an adhesive that is activated below the degradation temperature of the sheet materials. Thus, for example, a polypropylene fabric which shrinks at 200° F. can be safely laminated to a ⅜ to ½ inch thick sheet of open-cell foam using a thermoplastic adhesive having a melt point of about 220° F.

The method of this invention may be used to laminate more than two sheets of material together, if desired. In the shoe industry, for example, a laminate of interlining fabric, thin foam, and upper material often is used. The interlining is usually a thin cloth, such as a woven cotton or cotton and polyester blend. The foam normally is a polyurethane (polyether-based or polyester-based) and is approximately 1/16th inch thick. The upper material may be vinyl or leather, with or without a backing. The upper material is the most heat-sensitive sensitive of the three and may have a degradation temperature of about 190° F. To fuse together such a three-layer composite on a dry laminator would require using temperatures about 50 to 60 Fahrenheit degrees higher than the activation temperature of the adhesive, which makes it rather impractical to use hot melt adhesives.

If all layers of the sheet material are air-permeable, it can be advantageous to apply a vacuum to the side of the composite opposite where the steam enters. This helps pull the steam through the first sheet of material, into the adhesive layer. Also, it helps prevent condensation on the composite article, which may cause spotting.

The apparatus for practicing the process of the present invention comprises the following elements:

(a) a pair of opposed, open mesh, endless conveyor belts, disposed so as to permit a composite of two sheets of material and an intermediate layer of adhesive to be clamped between the belts, (b) means for revolving the belts in opposite directions so as to convey the composite between them, (c) a perforated platen mounted inside one of the belts, the holes of the platen facing the belt in the zone where the two belts clamp against the composite, (d) means for ejecting steam from the platen with enough force to pass through the adjacent belt, (e) means for cooling the second belt on its return to the head of the zone where it clamps against the composite, and (f) a pair of pressure rollers mounted adjacent the end of the zone where the belts clamp against the composite, adapted to receive and compress the composite after it has left said zone.

The platen preferably is made of cast aluminum. Behind its perforated face is an enclosed steam chamber. This chamber preferably will be supplied with superheated steam. It also is preferred that there be separate means, apart from the superheated steam, for heating the platen. Electrical resistance heaters can be used, for example. These advantageously are mounted on the outside of the platen.

Substantially the entire contact surface of the platen should be perforated. The holes should be relatively small, e.g., having a diameter in the range of about 0.030 to 0.080 inch, so that the steam jets will be narrow. The platen holes should be spaced rather closely together—the smaller the holes, the closer the spacing. Ideally, the holes should not be more than about 0.750 inch apart.

The perforated surface of the platen preferably is slightly bowed, or arched, and normally is pressed outwardly against the adjacent belt, so as to provide a smooth path and a relatively even clamping pressure between the belts.

Each conveyor belt has an open mesh, or weave, so as to be air-permeable. The belt adjacent the steam platen preferably presents as small a pressure drop across the steam path as possible. Preferably this belt will have an open area constituting at least about 30 percent of the total surface area of the belt, e.g., about 30 to 60 percent. The other belt can be less open, e.g., having a open area of only about 5 to 20 percent. Both belts should be heat resistant, for example having a degradation temperature above about 400° F. Belts made of fiberglass or Nomex ® aramid fibers, coated with Teflon polytetrafluoroethylene resin, are ideal.

The apparatus may preferably be equipped with heater means positioned along the return path of the first belt, so as to re-heat the belt before it comes back to the head of the clamping zone.

It is also preferred that the apparatus include vacuum means mounted inside the second belt (i.e., not the belt encircling the platen) in such a way as to pull air and steam through both belts along their clamping zone.

The means for cooling the second conveyor belt during its return to the head of the clamping zone need not be elaborate. Simply exposing the belt to the open air will suffice.

For a fuller understanding of the method and apparatus of the present invention, reference is made to the drawings accompanying this specification. These drawings depict a preferred embodiment of the apparatus and show how it works. Referring to the drawings.

Figure 1:
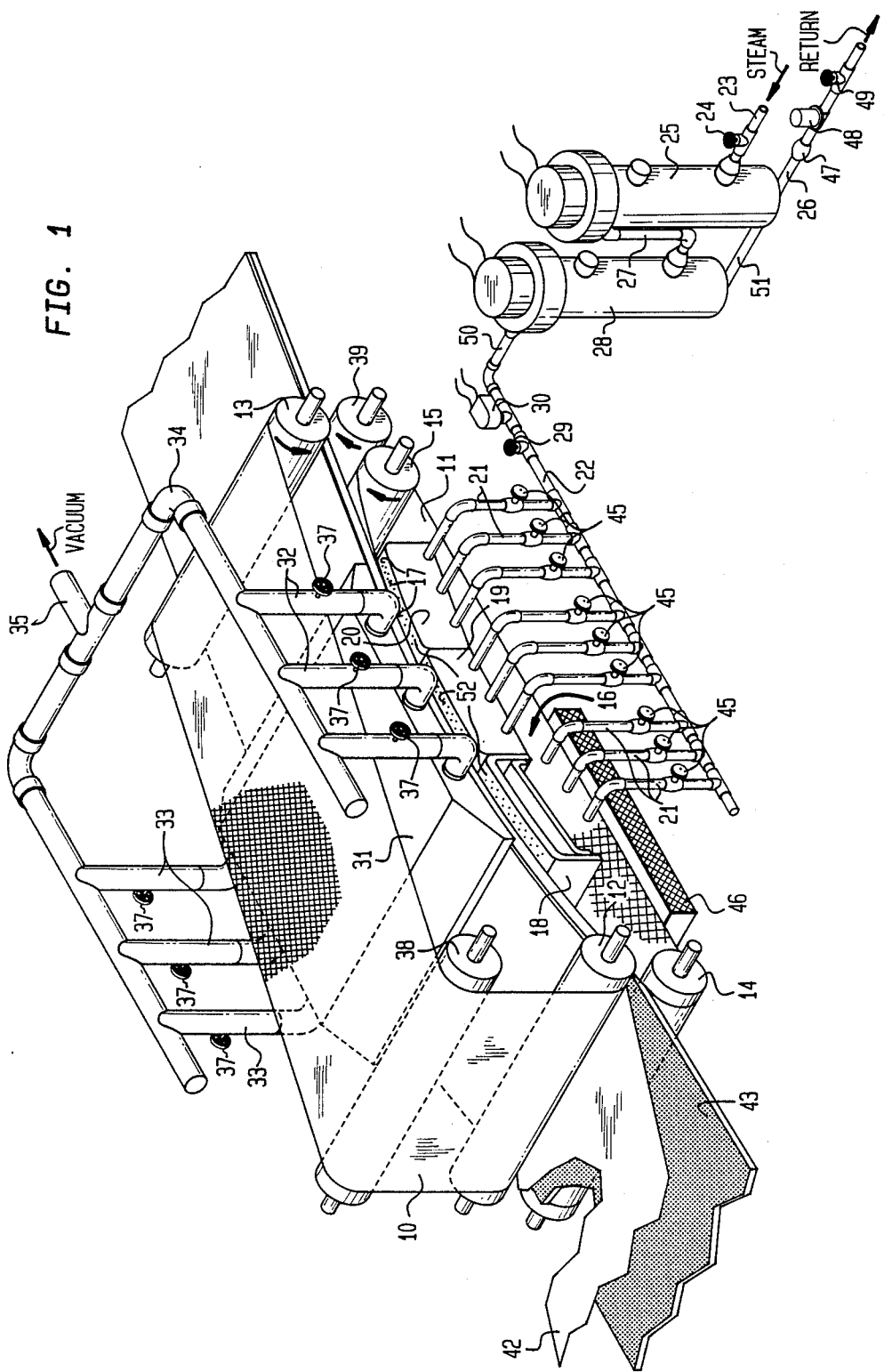
FIG. 1 is an isometric view of the apparatus (partially cut away) but without its frame.

As shown in FIG. 1, endless conveyor belts 10 and 11 are mounted in opposition to one another. Belt 11 is driven clockwise by roller 15, while belt 10 is driven counterclockwise by roller 13. Both belts are made of a Teflon-coated, open weave fiberglass. Belt 10 has a closer weave, with an open area of only about 15 percent. Belt 11 has an open area of about 50 percent. Belt 10 runs around two idler rollers 12 and 38; belt 11 runs around one idler roller 14.

Pressing up against the underside of belt 11 is a slightly arched platen assembly 16, the entire contact surface 52 of which is perforated with holes 17, having a diameter of about 0.065 inch and spaced about 0.625 inch apart. Platen assembly 16 consists of three enclosed steam compartments 18, 19, and 20. (In FIG. 1 steam compartment 18 is shown without its end cover, for purposes of clarity.) Each of these compartments is supplied with superheated steam by three branch lines 21, coming from manifold line 22. Each supply line 21 is equipped with a manual flow control valve 45, which allows the steam to be balanced across the compartment. Each compartment 18, 19, and 20 is connected to a drain line (not shown) for removal of condensate.

Saturated plant steam enters the system via line 23, through manual control valve 24, into first pressure vessel 25. The saturated steam in line 23 may have a pressure of, say about 40 to 90 psig, which gives it a temperature of about 285° to 330° F. Usually saturated steam having a pressure of about 75 to 85 psig will be used. Inside vessel 25 the steam is heated further by electric coils (not shown) to a temperature of, say, about 375° to 400° F. The pressure remains relatively constant, however. Condensate is drained from tank 25 via line 26, which is sloped downwards. Line 26 is equipped with a particle strainer 47, a 125 psig steam trap 48, and a check valve 49.

From vessel 25 the steam flows through line 27 over into pressure vessel 28, wherein it is heated still further, for example to about 460° to 475° F. Condensate from vessel 28 passes through drain line 51, which connects (not shown) with condensate line 26. Again, the pressure is maintained relatively steady. From vessel 28 the superheated steam exits via line 50, through manual valve 29 and solenoid valve 30, into manifold line 22.

Mounted inside upper conveyor belt 10 is slightly arched vacuum hood 31. Tubes 32 and 33 connect hood 31 with U-shaped manifold 34. Each of the tubes 32 and 33 is equipped with a manual control valve 37. Manifold 34, in turn, is supplied by vacuum line 35, which is controlled by a solenoid valve (not shown). A vacuum of about 10 to 60 cubic feet per minute, for each square foot of platen surface, is preferred.

As seen in FIG. 1, upper conveyor belt 10 passes through ambient air from the time it is taken up by roller 13 until it once again begins its passage over platen 16, which serves to cool the belt. Bottom conveyor belt 11, on the other hand, passes over radiant heater 46 just before it reaches roller 14. Heater 46 preferably preheats belt 11 to about 225° to 250° F. to help prevent condensation from forming when first contact with the steam is made. Because of these features, this apparatus may be used to laminate a fairly heat-sensitive material to one that is less heat-sensitive, provided the latter is porous to steam. A velour fabric, for example, can be laminated to open- cell polyurethane foam, using a powdered adhesive having a melt point of 230° F., without the face temperature of the velour ever reaching higher than about 190° F.

Figure 2:
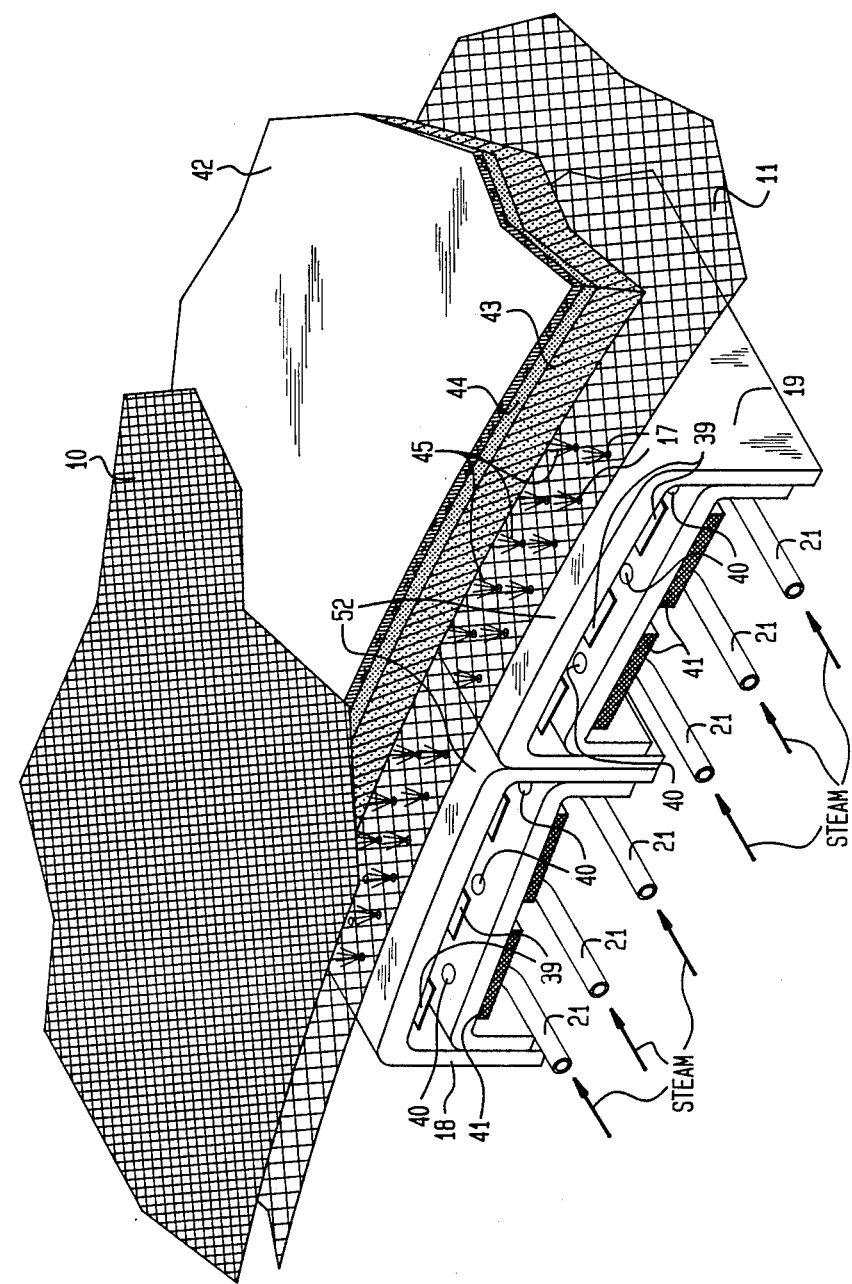
FIG. 2 is an enlarged, isometric view of a portion of the clamping zone and adjacent steam platens, showing them being used to heat a composite of fabric, adhesive, and cushion foam.

FIG. 2 shows steam compartments 18 and 19 with the end covers removed. Positioned inside each compartment is a baffle 39, which is mounted above the opening 40 of the steam line and which serves to disperse the inrushing superheated steam throughout the compartment. Bolted to the underside of compartments 18 and 19 are electrical heater elements 41.

In FIG. 2 the equipment is shown being used to laminate a woven polyester and spandex fabric 42 to a ½ inch thick sheet of open-cell, thermoplastic foam 43, made of polyether-based polyurethane. Between fabric 42 and foam 43 is a layer of powdered polyamide adhesive 44 having a melt point of about 220° F. The adhesive 44 is sprinkled onto the sheet of foam 43 at a preceding station (not shown) at a uniform application rate of about 0.7 oz. per square yard. Belts 10 and 11 convey the layered composite past steam jets 45 at a slow enough speed that all of the adhesive 44 is melted by the time the composite is removed from the belts. Thus, for example, the time it takes for the composite to travel from the first row of steam jets to the last may be about 15 seconds. The steam entering compartments 18 and 19 is at a pressure of about 80 psig and a temperature of about 500° F. The output of electric heaters 41 is set to warm the interior of compartments 18 and 19 to approximately 250° F. prior to the admission of the steam. Due to its being circulated in the open air on its return path, top belt 10 reaches a maximum temperature of only about 175° F.

After running off the end of lower belt 11, the composite is passed between upper drive roller 13 and nip roller 39. Those two rollers are set to apply a pressure to the composite of about 60 lbs. per square inch. The source of this pressure is two 2½ inch diameter air cylinders (not shown) that press down on drive roller 13.

The normal steam pressures used in industry are less than 100 psig. Higher pressures require more sophisticated and expensive piping, fittings, and equipment to be used safely. Using the superheated steam laminator of the present invention, high temperatures necessary for many laminations can be achieved without having to handle the high pressures required when working with saturated steam at those temperatures.

We claim:

1. Apparatus for continuously laminating two sheets of material together, using a heat-activatable or moisture-curing adhesive, wherein at least one of the sheets is steam-permeable, which comprises:
   (a) first and second opposed, open mesh, endless conveyor belts, disposed so as to permit a composite of two sheets of material and an intermediate layer of adhesive to be clamped therebetween in a clamping zone, each belt having an inside surface and an outside surface, the outside surface being the surface which touches the composite when it is clamped between the belts;

(b) means for revolving the belts in opposite directions so as to convey the composite between them;

(c) a platen mounted adjacent the inside surface of the first belt, said platen having an enclosed chamber with a perforated surface facing the first belt in the clamping zone;

(d) means for supplying superheated steam to said platen chamber under sufficient pressure to eject the steam through the perforations in the platen with enough force to pass through the first belt;

(e) means for cooling the second belt during its return to the clamping zone; and (f) a pair of pressure rollers mounted adjacent to the end of the first belt, said rollers being adapted to receive and compress the composite after the composite has run off the end of said belt.

2. The apparatus of claim 1 including means apart from the superheated steam for heating said platen.

3. The apparatus of claim 2 wherein said heating means comprises at least one electrical resistance heater element attached to the platen and wherein one of the pair of pressure rollers is mounted inside the second conveyor belt.

4. The apparatus of claim 3 wherein said heater element is mounted on the outside of the platen.

5. The apparatus of claim 4 wherein the first belt has an open area constituting about 30 to 60 percent of the surface area of the belt and the second belt has an open area constituting about 5 to 20 percent of the surface area of the belt.

6. The apparatus of claim 5 wherein each of the belts is made of a fabric having a degradation temperature above about 400° F.

7. The apparatus of claim 6 wherein the holes in the platen have a diameter in the range of about 0.030 to 0.080 inch and are spaced no more than about 0.750 inch apart.

8. The apparatus of claim 7 wherein the platen is made of cast aluminum.

9. The apparatus of claim 8 additionally including vacuum means mounted inside the second belt in such a location as to be capable of pulling air and steam through both belts in the clamping zone.

10. Apparatus for continuously laminating two sheets of material together, using a heat-activatable or moisture- curing adhesive, wherein at least one of the sheets is steam-permeable, which comprises:

(a) a pair of opposed, air-permeable, endless conveyor belts, disposed so as to permit a composite of two sheets of material and an intermediate layer of adhesive to be clamped therebetween, each belt having an inside and an outside, the outside being the surface which touches the composite when it is clamped between the belts;

(b) means for revolving the belts in opposite directions so as to convey the composite between them;

(c) a platen mounted adjacent the inside of the first of said belts, said platen having an enclosed chamber with a perforated surface facing the adjacent belt in the zone where the two belts clamp against the composite;

(d) means for supplying superheated steam to said platen chamber under sufficient pressure to eject the steam through the perforations in the platen with enough force to pass through the adjacent belt;

(e) means for cooling the second of said belts during its return to the head of the clamping zone; and (f) means for compressing the composite after it leaves the steam ejection zone.

11. The apparatus of claim 10 wherein the steam supply means is operable to supply steam to the enclosed chamber of the platen at a pressure in the range of about 40 to 90 psig and a temperature at least about 50 Fahrenheit degrees above the saturation temperature corresponding to its pressure.

12. The apparatus of claim 11 wherein at least the outside surface of the first belt is composed of a polytetrafluoroethylene resin.

13. The apparatus of claim 12 wherein the steam supply means includes a vessel equipped with steam inlet means, an internal electric coil heater, and steam outlet means, and the first belt has an open area constituting at least about 30 percent of the total surface area of the belt.

14. The apparatus of claim 12 wherein the steam supply means includes at least two vessels connected in series, each vessel being equipped with steam inlet means, an internal electric coil heater, and steam outlet means.

15. The apparatus of claim 9 wherein the steam supply means is operable to supply steam to the enclosed chamber of the platen at a pressure in the range of about 40 to 90 psig and a temperature at least about 50 Fahrenheit degrees above the saturation temperature corresponding to its pressure.

16. The apparatus of claim 15 wherein the steam supply means includes at least two vessels connected in series, each vessel being equipped with steam inlet means, an internal electric coil heater, and steam outlet means.

17. The apparatus of claim 13 wherein the means for cooling the second belt comprises means for exposing the belt to open air.

18. The apparatus of claim 9 wherein the vacuum means is operable to pull about 10 to 60 cubic feet of air per minute, for each square foot of the platen surface, and the conveyor belts are horizontally disposed, with the first belt being on the bottom.

19. The apparatus of claim 18 wherein the platen is arched and the convex side thereof presses against the inside of the first belt.

20. The apparatus of claim 19 wherein the steam supply means is operable to supply steam to the enclosed chamber of the platen at a pressure in the range of about 75 to 85 psig and a temperature about 100 to 300 Fahrenheit degrees above the saturation temperature corresponding to its pressure.

21. The apparatus of claim 20 wherein the steam supply means includes at least two vessels connected in series, each vessel being equipped with steam inlet means, an internal electric coil heater, and steam outlet means.

22. The apparatus of claim 21 additionally including means for re-heating the first belt during its return to the head of the clamping zone.

* * * * *